US007119922B2

(12) United States Patent
Kimura et al.

(10) Patent No.: US 7,119,922 B2
(45) Date of Patent: Oct. 10, 2006

(54) PRINTING DEVICE FOR CARRYING OUT A PRINTING OPERATION ON A SURFACE OF A DISK

(75) Inventors: Kazuhiro Kimura, Wakayama (JP); Yuji Yamamoto, Wakayama (JP); Hiroo Ikeura, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 888 days.

(21) Appl. No.: 09/861,769

(22) Filed: May 22, 2001

(65) Prior Publication Data

US 2001/0046057 A1 Nov. 29, 2001

(30) Foreign Application Priority Data

May 23, 2000 (JP) ............................ 2000-150909

(51) Int. Cl.
*G06F 15/00* (2006.01)
*G06K 1/00* (2006.01)

(52) U.S. Cl. ...................................... 358/1.8; 358/1.12

(58) Field of Classification Search ............... 358/1.14, 358/1.15, 1.8, 1.12; 347/4, 2, 9, 105, 37, 347/38, 233; 345/629, 636; 101/38.1, 35, 101/93.11, 93.17; 156/387, 384
See application file for complete search history.

(56) References Cited

U.S. PATENT DOCUMENTS

| | | | | |
|---|---|---|---|---|
| 5,518,325 | A * | 5/1996 | Kahle | 400/70 |
| 5,809,003 | A * | 9/1998 | Taira et al. | 369/275.1 |
| 5,967,676 | A * | 10/1999 | Cutler et al. | 400/70 |
| 6,019,151 | A * | 2/2000 | Wen et al. | 156/387 |
| 6,074,031 | A * | 6/2000 | Kahle | 347/4 |
| 6,202,550 | B1 * | 3/2001 | Lee et al. | 101/38.1 |
| 6,264,295 | B1 * | 7/2001 | Bradshaw et al. | 347/2 |
| 2002/0114627 | A1 * | 8/2002 | Truc et al. | 396/429 |

FOREIGN PATENT DOCUMENTS

| | | | |
|---|---|---|---|
| EP | 1 108 550 | A | 6/2001 |
| JP | 5-238005 | A | 9/1993 |
| JP | 6-031906 | A | 2/1994 |
| JP | 6-338079 | A | 12/1994 |
| JP | 7-220281 | A | 8/1995 |
| JP | 2000-071525 | A | 3/2000 |
| JP | 2000-225733 | A | 8/2000 |
| WO | WO 00/12314 | A | 3/2000 |

* cited by examiner

*Primary Examiner*—Douglas Q. Tran
(74) *Attorney, Agent, or Firm*—Smith Patent Office

(57) ABSTRACT

A printing device of the present invention includes a printing head for carrying out a printing operation on one side of a surface of a disk, such as a CD-R medium, and arranged such that the printing operation is performed on the disk as the disk and the printing head are relatively shifted by the rotation of the disk.

11 Claims, 7 Drawing Sheets

PRINTING DEVICE FOR CARRYING OUT A PRINTING OPERATION ON A SURFACE OF A DISK

TECHNICAL FIELD OF THE INVENTION

The present invention relates to a printing device, and more specifically to a printing device which is suitably used in combination with a photograph processing apparatus.

BACKGROUND OF THE INVENTION

Photograph processing apparatuses which can automatically carry out processes such as exposing, developing, bleach fixing and stabilizing process on a photosensitive material such as photographic paper have been known in the art. Upon exposing a photosensitive material in such a photograph processing apparatus, a direct (analog) exposing process, which exposes the photosensitive material by light transmitted through a photograph film, has been widely used. In recent years, on the contrary, a so-called digital exposing process has been put into practical use, in which the photosensitive material is exposed by using light that is controlled based upon digital image signals obtained by picking up an image of a film using a film scanner provided with image-pickup elements such as CCDs. The application of the digital exposing system makes it possible to perform various image processing operations, such as color correction, density correction and sharpness treatments, with a high degree of freedom, as well as to readily carry out a extra-copying process, and thus it enables to provide good prints with high quality that are superior in the reproducibility in colors and density as well as in the resolution.

At the same time, as personal computers have come to be widely used in homes and offices, such business service has been started, in which digital image data obtained by picking up images from developed films is recorded in a removable recording medium such as an FD (floppy disk), a CD (compact disk) and the like and at the time of returning the films, this is given to a customer together with sheets of photographic paper that have been printed. With this service, customers are allowed to edit the image data using personal computers at home or in the office, as well as to readily obtain copies of the prints that have same image quality as the initial prints by taking the recording medium to a photo-print shop upon ordering more copies of the prints.

Furthermore, still another business service has been prospected of practical application in which index prints are placed on the surface of the recording medium storing the digital image data so that the contents of the image data stored in the recording medium can be confirmed at a glance. For example, in order to print such index prints and the like, on the surface of, for example, a CD-R (Compact Disc-Recordable: a write once, read many type recordable CD which can be written only once) medium, an ink-jet printing device is used in some cases. As illustrated in FIG. 7, in such an ink-jet printing device, normally, a CD-R medium 101 is fixed onto a predetermined position, and as a printing head 102 is shifted on the entire surface thereof laterally and longitudinally, the corresponding prints are formed on the CD-R medium 101.

However, in the generally-used ink-jet printing device as shown in FIG. 7, it is necessary to maintain a shifting region of the printing head 102 that occupies the entire area on the surface of the CD-R medium as an operation space, and it is not possible to place any members on this region, resulting in causing a problem of difficulty in miniaturizing the device. Moreover, another problem is that, in the case that the printing head 102 is smaller when compared to the CD-R medium 101, the printing head 102 needs to be frequently altered in its shifting directions on the CD-R medium 101, resulting in causing a problem of taking relatively long time in its printing operation.

Moreover, in the case of the generally-used ink-jet printing device as shown in FIG. 7, since this is placed as a device separated from the CD-R drive for recording digital image data in the CD-R medium, there is a problem that another installation space is required in addition to the photograph-processing apparatus. In particular, since, the photograph-processing apparatus is installed in a relatively narrow space in many cases, it is often difficult to provide an installation space for the printing device, and this results in a major obstacle upon carrying out the index printing service.

Therefore, the main object of the present invention is to provide a relatively small-sized printing device which can carry out a printing operation on a disk such as a CD-R medium in a short time.

Moreover, another object of the present invention is to provide a printing device which can save space in the case when it is used by being built into a photograph-processing apparatus and the like.

SUMMARY OF THE INVENTION

In order to achieve the above-mentioned object, a printing device in accordance with the present invention includes a printing head for carrying out a printing operation on one surface of a disk which rotates around the center thereof, wherein the printing operation is performed on the disk as the disk and the printing head are relatively shifted by the rotation of the disk.

According to the present invention, the printing operation is carried out on the disk by the rotation of the disk, while the printing head is stationary. Therefore, it is possible to carry out a printing operation on the disk in a short time by simply rotating the disk once or a plurality of times in accordance with the length and orientation of the printing head.

Moreover, since the disk and the printing head are relatively shifted by the rotation of the disk, in accordance with the length and the orientation of the printing head, it is not necessary to translate neither the printing head nor the disk, or even when the printing head or the disk needs to be translated in addition to rotate the disk, it is possible to greatly reduce its shifting range. Consequently, any member can be placed even on a space where conventionally no member has been able to be placed since it is in the shifting region of the printing head, thereby making it possible to reduce the size of the device.

In the printing device according to the present invention, the printing head is preferably fixedly secured and has a length not less than that of a printing area located between the rotation center of the disk and the edge thereof.

In accordance with this aspect, in the printing device, even approximate one rotation of the disk makes it possible to carry out printing over the entire printing area between the center of the disk and the edge thereof; therefore, it is possible to greatly shorten the time required for the printing. Moreover, since the printing head or the disk needs not be translated, it becomes possible to greatly simplify the device, and also to reduce the size of the device.

In the printing device in accordance with the present invention, the printing head is preferably allowed to relatively shift in a direction crossing the direction of the rotation of the disk. In accordance with this aspect, it is possible to use a small-size printing head that is shorter than the length of the printing area located between the rotation center of the disk and the edge thereof.

Furthermore, in the printing device in accordance with the present invention, the printing head is preferably placed in a radial manner with respect to the rotation center of the disk of the printing head. In accordance with this aspect, since the printing head is placed in a radial manner with respect to the rotation center of the disk, it is possible to easily control the driving operation of the printing head, and also to reduce the number of revolutions of the disk required for carrying out the printing operation over the entire area of the disk to a minimum in the case that the printing head is relatively short.

In the printing device in accordance with the present invention, a plurality of the printing heads are preferably provided. In accordance with this aspect, a color printing operation is carried out on the disk by the plurality of the printing heads.

In the printing device in accordance with the present invention, it is preferable that the device further includes a recording head for recording data on a surface opposite to the printing surface of the disk. In accordance with this aspect, it is possible to carry out the printing process and data recording process on the disk by using the same device. For this reason, it is not necessary to provide a new installation space for the printing device. Moreover, it is possible to eliminate a time-consuming and complicated job in which the disk has to be moved between a data recording device and the printing device manually, and also to prevent a problem in which a wrong operation resulting from such a job might cause a difference between the contents of the prints on the disk and the contents of the recorded data.

In the printing device in accordance with the present invention, it is preferable that the printing process on the disk by the printing head and the data recording process on the disk by the recording head are carried out at the same time. In accordance with this aspect, since the printing process and the data recording process on the disk are carried out at the same time, it is possible to shorten the processing time, in comparison with a case in which these operations are carried out separately.

In the printing device in accordance with the present invention, it is preferable that the printing head prints information for identifying a photograph image. In accordance with this aspect, since the information for identifying a photograph image is printed by the printing head, a customer is allowed to confirm the contents of photograph images at a glance by viewing the printed disk.

Other and further objects, features and advantages of the invention will appear more fully from the following description taken in connection with the accompanying drawings.

DESCRIPTION OF THE PREFERRED EMBODIMENTS

Referring to Figures, the following description will discuss preferred embodiments of the present invention. The following description relates to a photograph processing apparatus of a digital exposure system in which a printing device in accordance with a first embodiment of the present invention is incorporated.

Figure 1:
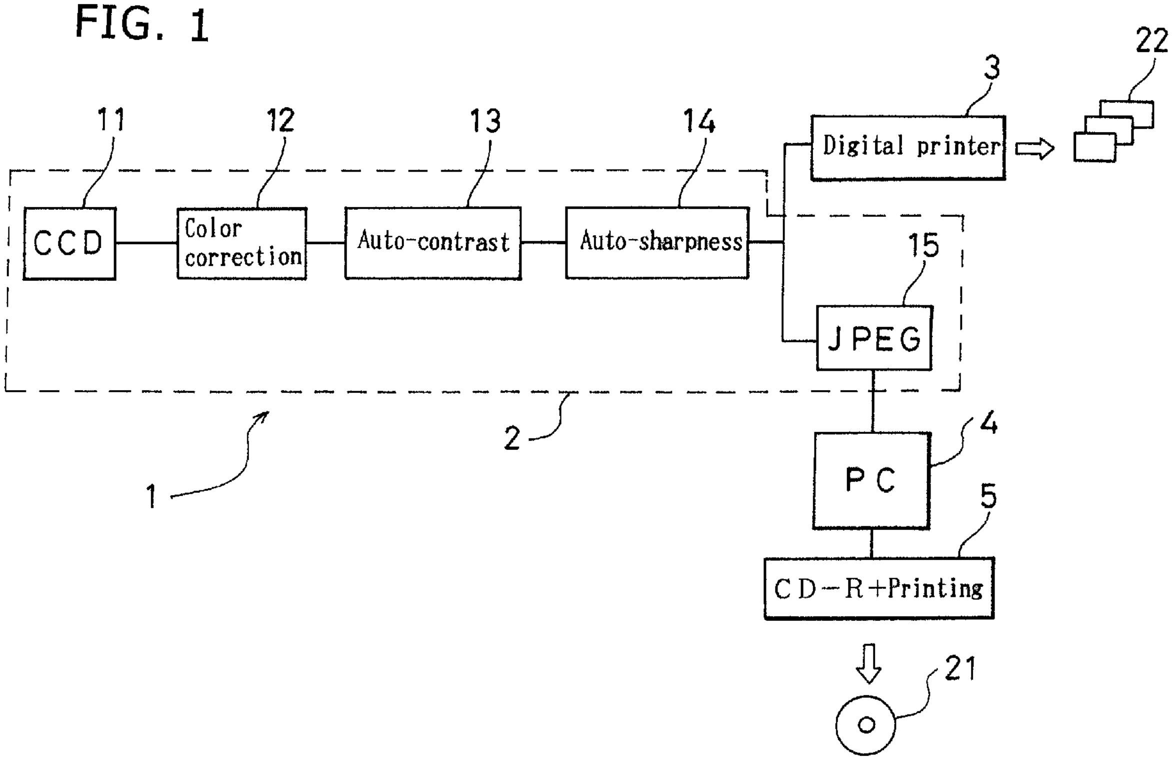
FIG. 1 is a block diagram that shows a photograph processing apparatus in which a printing device in accordance with a first embodiment of the present invention is incorporated.

A photograph processing apparatus 1, shown in FIG. 1, is provided with a scanner unit 2 for reading an image recorded in a film, an exposing and developing section (digital printer) 3 for carrying out processes, such as exposing, developing, bleach fixing and stabilizing processes, a personal computer 4 containing a control section for controlling the operation of the photograph processing apparatus 1 and a data recording and printing section 5 for recording image data on a CD-R medium 21 as well as for carrying out an index printing operation thereon.

The scanner unit 2 is provided with one or a plurality of line CCDs 11 constituted by photo-detector elements that are one-dimensionally aligned, a color correction section 12 for correcting colors, an auto-contrast processing section 13, an auto-sharpness processing section 14 and a JPEG compression section 15. An analog image signal, outputted from the line CCDs 11 where an image recorded in a film is picked up, is converted to a digital signal in an A/D converter (not shown), and then supplied to the color correction section 12. The color correction section 12 carries out a characteristic conversion on the image data in accordance with the film characteristic, and also carries out a color correction thereon by using one-dimensional LUT. The image data that has been subjected to the color correction is successively supplied to the auto contrast processing section 13 and the auto-sharpness processing section 14 where the auto-contrast adjustment and auto-sharpness adjustment are respectively carried out.

The image data, outputted from the auto-sharpness processing section 14, is supplied to the JPEG compression section 15. The image data that has been compressed in the JPEG compression section 15 is stored in an auxiliary storage section (not shown) such as a HD (hard disk) inside the personal computer 4. Here, the color correction section 12, the auto-contrast processing section 13, the auto-sharpness processing section 14 and the JPEG compression section 15 are preferably placed in the scanner unit 2 as hardware from the viewpoint of an improvement in the processing rate; however, these sections may be realized as software in the scanner unit 2 and/or the personal computer 4.

The image data, outputted from the auto-sharpness processing section 14 is also supplied to the exposing and developing device 3 connected to the scanner unit 2, in addition to be supplied to the JPEG compression section 15. In the exposing and developing device 3, an exposing head is controlled based upon the image data supplied from the scanner unit 2 so that a sheet of photographic paper is digital-exposed, and the sheet of photographic paper thus exposed is subjected to processes such as developing, bleach fixing, and stabilizing processes. Consequently, a print 22 of the image recorded in the film is outputted from the exposing and developing device 3.

Upon completion of an image pick-up process on a certain film image, the film is shifted by one frame so that an image recorded in the next frame is picked up by the CCD 11. In this manner, the same processes as described above are repeatedly carried out until the processes corresponding to one order have been completed. Upon completion of the processes of the one order, based upon an instruction given by the operator, digital image data corresponding to the one order, stored in the auxiliary storage section in the personal computer 4, is written in the CD-R medium 21 by using the data recording and printing section 5 connected to the personal computer 4. Simultaneously, index print data of the image data corresponding to the one order picked up by the CCDs 11 is supplied to the data recording and printing section 5 connected to the personal computer 4 so that an index print is applied to the surface of the CD-R medium 21 opposite to the data recording surface. Here, it is preferable to place an ink-receiving layer that readily absorbs ink on the print surface side of the CD-R medium 21.

In accordance with the photograph processing apparatus 1 having such arrangement, the image data from the scanner unit 2 is given not only to the personal computer 4, but also to the exposing and developing device 3 so as to carry out the digital exposing process and the like on sheets of photographic paper; therefore, photograph prints, derived from the image data that has been subjected to the same image processes as the data that has been JPEG compressed, are available together with the CD-R medium having the image data recorded thereon, at the same time. For this reason, it is possible to readily complete an order from a customer in a short time.

Figure 2:
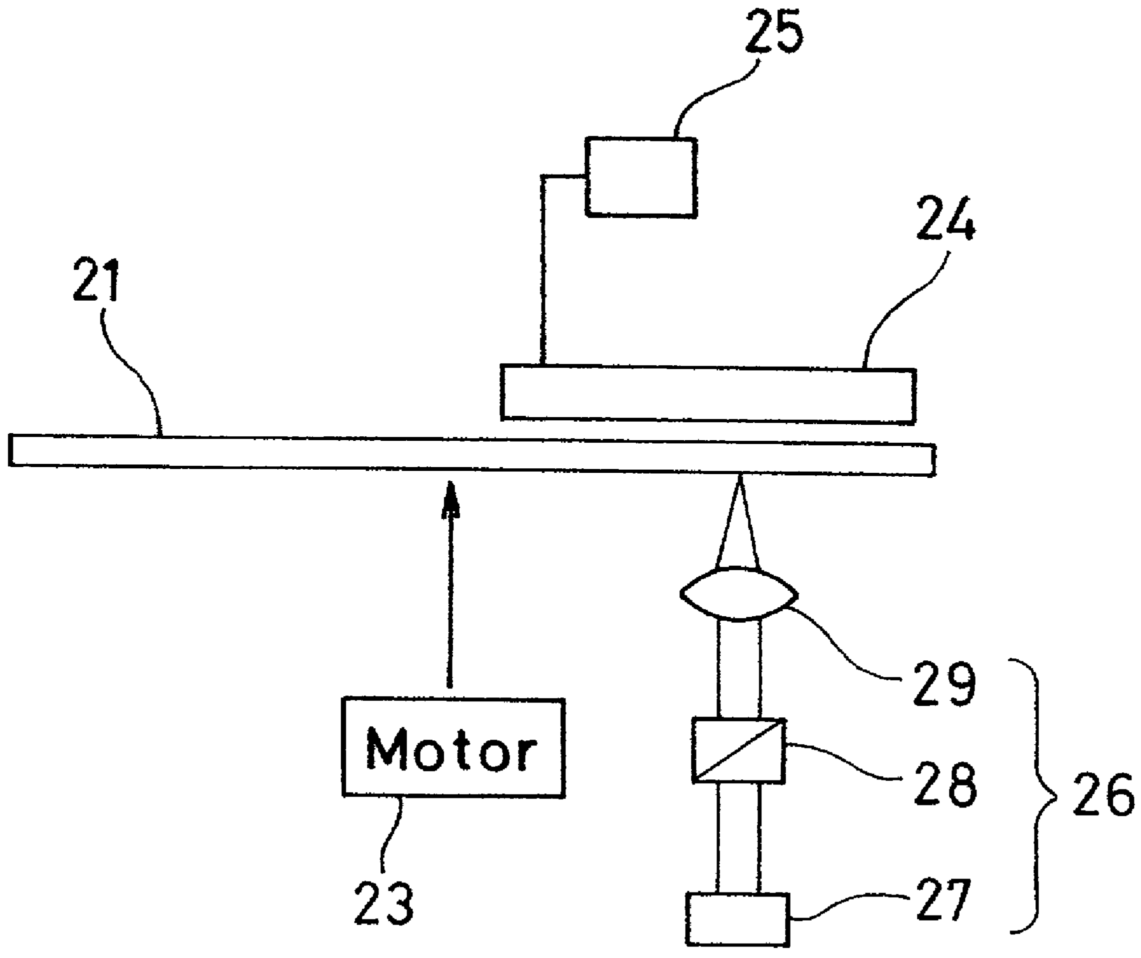
FIG. 2 is a schematic drawing that shows a structure of a data recording and printing section contained in the photograph processing apparatus of FIG. 1.
Figure 3:
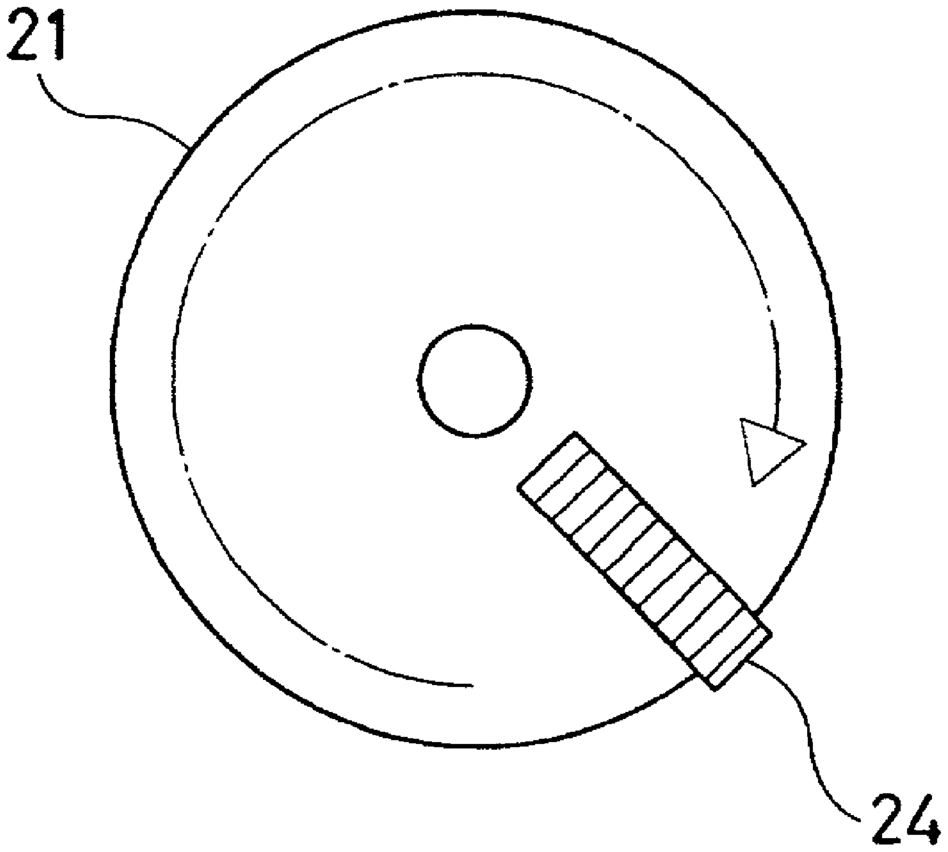
FIG. 3 is a schematic plan view that shows the data recording and printing section on which a CD-R medium is placed.

Next, referring to FIGS. 2 and 3, an explanation will be given of one example of the construction of the data recording and printing section 5. In FIG. 2, a motor 23 rotates the CD-R medium 21 in a predetermined direction by rotating a shaft (not shown) for supporting the CD-R medium 21, inserted into the hole formed in the center of the CD-R medium. A printing head 24 of an ink-jet system for discharging monochrome ink is fixedly secured along the radial direction of the CD-R medium 21 above the upper surface of the CD-R medium 21. The CD-R medium 21 has its almost entire area as a print area except for the vicinity of the center of the rotation and the vicinity of the edge portion. The printing head 24 has a length that is substantially the same as the radius of the CD-R medium 21, and has a number of elements for discharging ink one-dimensionally aligned along the longitudinal direction thereof. A printing driver 25 is connected to the printing head 24. The printing driver 25 receives image data for printing from the personal computer 4, and generates a driving signal for driving the printing head 24.

A data recording and reading head 26, which has a laser generator 27, a beam splitter 28 and an objective lens 29, is placed on the lower surface side of the CD-R medium 21. The data recording and reading head 26, which is driven by a driving device, not shown, is allowed to shift along the radial direction of the CD-R medium 21. In the case that data is recorded in the CD-R medium 21 by the data recording and reading head 26, a high-output laser light beam, selectively radiated from the laser generator 27, is converged on a recording layer of the CD-R medium 21 through the beam splitter 28 and the objective lens 29. Thus, the phase of the recording layer is changed so that desired data is recorded on the CD-R medium 21. When the data recorded in the CD-R medium 21 is read, a low-output laser light beam, radiated from the laser generator 27, is used and some of the resulting light reflected from the surface of the CD-R medium 21, which has been made incident on a detector (not shown) through the beam splitter 28, is detected.

In the present embodiment, as the CD-R medium 21 and the printing head 24 are relatively shifted by the rotation of the CD-R medium 21, an index print corresponding to one order is applied to the upper surface of the CD-R medium 21. Here, the printing head 24, which is placed in a radial manner with respect to the rotation center of the CD-R medium 21 (that is, in a manner so as to coincide with the radial direction of the CD-R medium 21), has substantially the same length as the radius of the CD-R medium; therefore, it is possible to carry out a printing process on the entire upper surface of the CD-R medium 21 in a short time in which the CD-R medium 21 rotates once. Moreover, since neither the printing head 24 nor the CD-R medium 21 need to be translated, it is possible to simplify the structure of the data recording and printing section 5, to place another member in a space above the upper surface of the CD-R medium 21, and consequently to miniaturize the data recording and printing section 5. Moreover, since the printing head 24 is placed in a radial manner with respect to the rotation center of the CD-R medium 21, it is possible to easily control the driving operation of the printing head 24.

Moreover, the printing of the index print onto the upper surface of the CD-R medium 21 and the data recording onto the lower surface thereof are carried out by using only the data recording and printing section 5; therefore, it is not necessary to place either the printing section or the data recording section in a separate manner from the data recording and printing section 5, thereby making it possible to save the corresponding installation space. In addition, the printing and data recording onto the CD-R medium 21 are carried out only in the data recording and printing section 5, it is possible to eliminate a time-consuming and complicated job in which the CD-R medium 21 has to be moved between the data recording section and the printing section manually, and also to positively prevent a problem in which a wrong operation resulting from such a job might cause a difference between the contents of the prints on the CD-R medium 21 and the contents of the recorded data.

Furthermore, in accordance with the present embodiment, since the printing of the index print onto the CD-R medium 21 and the data recording thereof are carried out simultaneously, it is possible to shorten the processing time in comparison with a case in which these processes are carried out in a separate manner. Moreover, the CD-R medium 21 obtained by the present embodiment has its index print for identifying the contents of the recorded image data placed on the upper surface thereof; therefore, a customer is allowed to confirm the contents of photograph images recorded therein at a glance by viewing the index print on the CD-R medium 21.

Figure 4A:
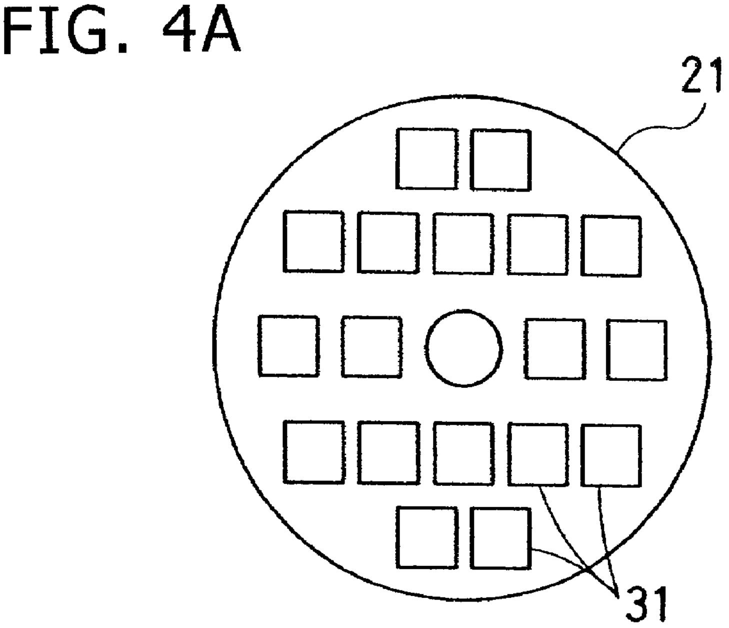
FIGS. 4A and 4B are drawings that each shows an example of a CD-R medium to which index prints are applied in accordance with the first embodiment of the present invention.
Figure 4B:
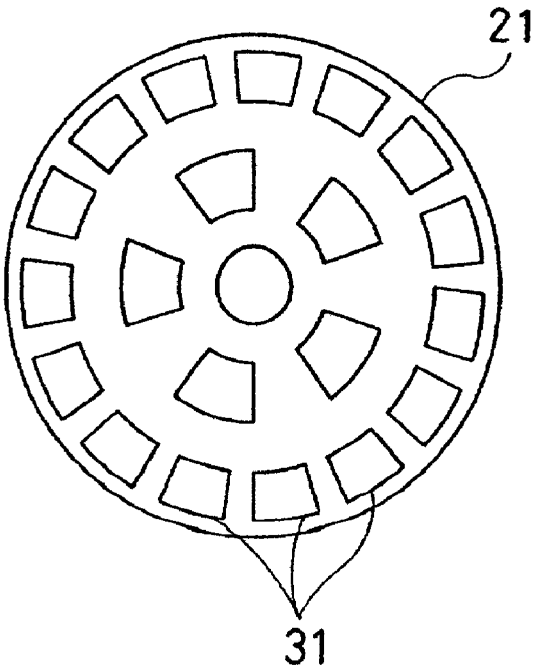

FIGS. 4A and 4B show examples of the CD-R medium 21 to which index prints are applied in accordance with the present embodiment. FIG. 4A shows one example in which a number of framed images 31 are printed on the CD-R medium 21 laterally and longitudinally in a matrix format.

FIG. 4B shows another example in which a number of framed images 31 are printed on the CD-R medium 21 in a radial manner. In the present embodiment, the framed images 31 may be printed in either the matrix format or the radial manner; however, in order to reduce a load imposed on the printing driver 25, it is preferable to print the framed images 31 of the index print in a radial manner. Here, the contents printed on the upper surface of the CD-R medium 21 may be character information for identifying the framed images, such as explanations of the contents of the respective framed images and dates of taking pictures. For this reason, a magnetic head (not shown) for reading character information recorded on the film may be provided in the photograph processing apparatus 1.

Moreover, the present embodiment may be applied not only to the image data read by the scanner unit 2, but also to, for example, image data picked up by a digital camera. For this purpose, a PC card reader suitable for a semiconductor memory card such as a "Compact Flash" or a "Smartmedia" is connected to the personal computer 4 so that image data, read from the memory card attached thereto, may be recorded on the CD-R medium 21 by the data recording and printing section 5.

Figure 5A:
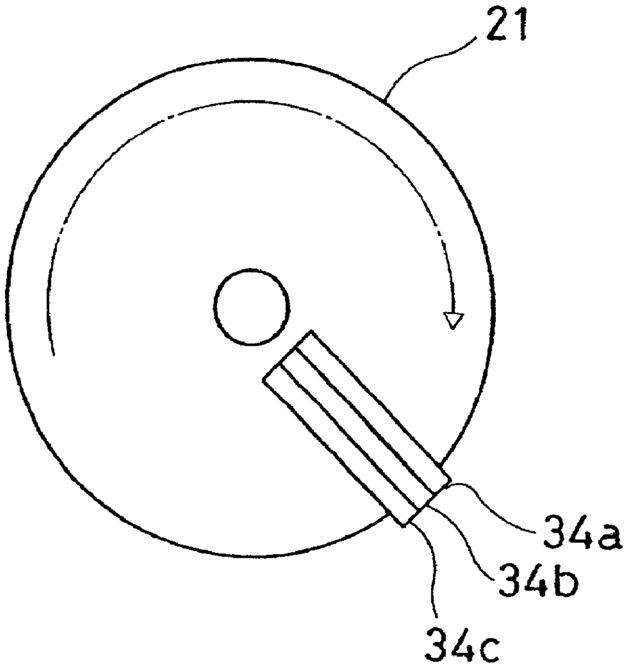
FIGS. 5A and 5B are schematic plan views that each shows a data recording and printing section on which a CD-R medium is placed in accordance with second and third embodiments of the present invention.

The following description will discuss a second embodiment of the present invention. As illustrated in FIG. 5A, the present embodiment is only different from the first embodiment in that, instead of the printing head 24, three printing heads 34*a*, 34*b* and 34*c* of cyan, magenta and yellow, are installed closely to each other. In accordance with the present embodiment, a color printing operation is carried out on the upper surface of the CD-R medium 21 by using the three printing heads 34*a*, 34*b* and 34*c* of cyan, magenta and yellow. Here, in the present embodiment, while the printing head 34*b* is installed in a radial manner with respect to the rotation center of the CD-R medium 21, the rest two printing heads 34*a* and 34*c* are not installed in a radial manner with respect to the rotation center of the CD-R medium 21. Consequently, this arrangement might cause complicated control operations with respect to the printing heads 34*a* and 34*c*.

Figure 5B:
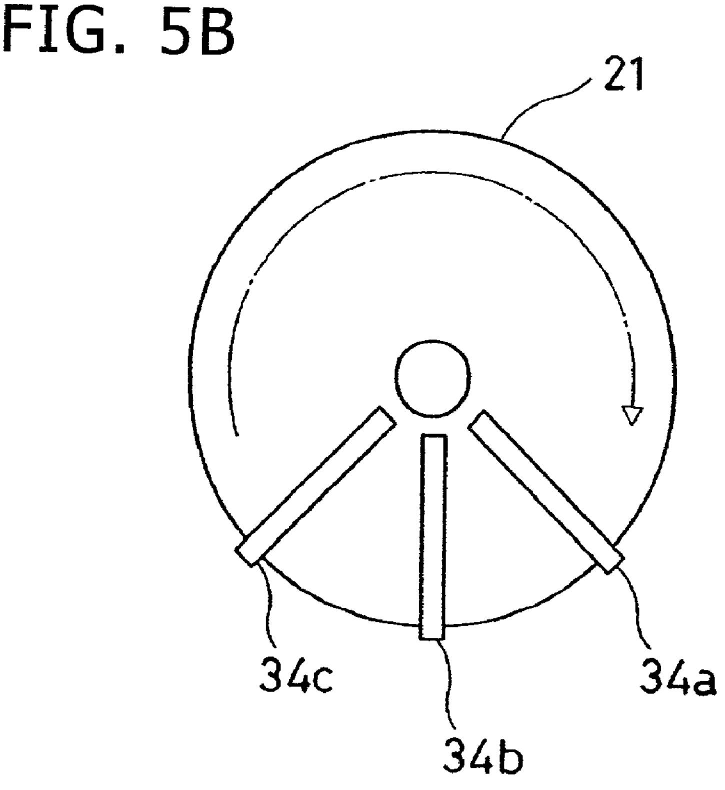

The following description will discuss a third embodiment of the present invention. As illustrated in FIG. 5B, the present embodiment is different from the second embodiment only in the point that the three printing heads 34*a*, 34*b* and 34*c* of cyan, magenta and yellow are placed in a radial manner with respect to the rotation center of the CD-R medium 21 separately from each other. A color printing operation is also carried out on the upper surface of the CD-R medium 21 by the present embodiment, and further this arrangement has an advantage in that the controlling operation for driving the printing heads 34*a*, 34*b* and 34*c* can be easily carried out.

Figure 6:
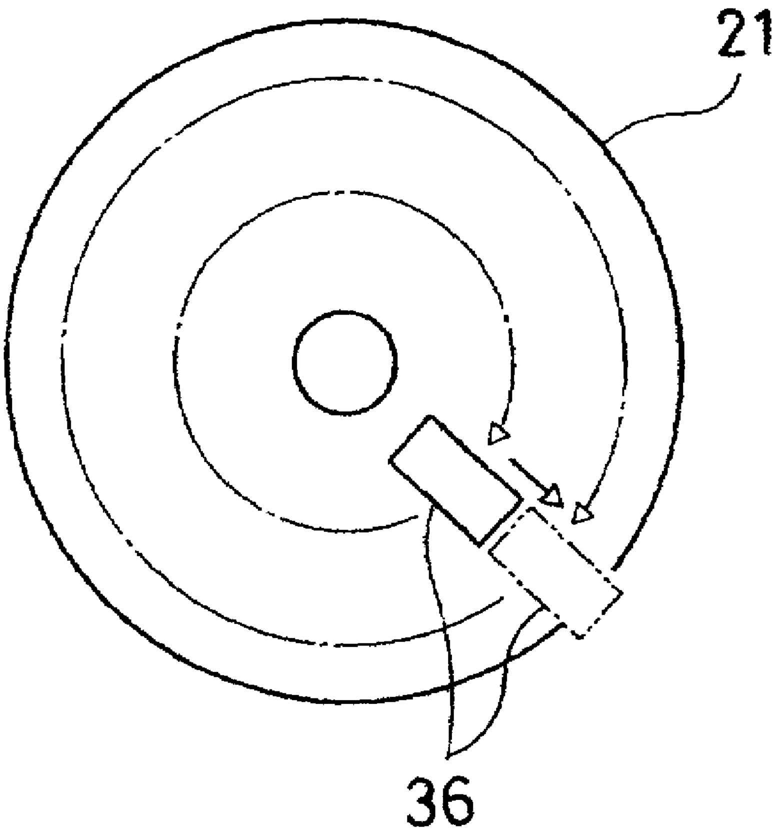
FIG. 6 is a schematic plan view that shows a data recording and printing section on which a CD-R medium is placed in accordance with a fourth embodiment of the present invention.
Figure 7:
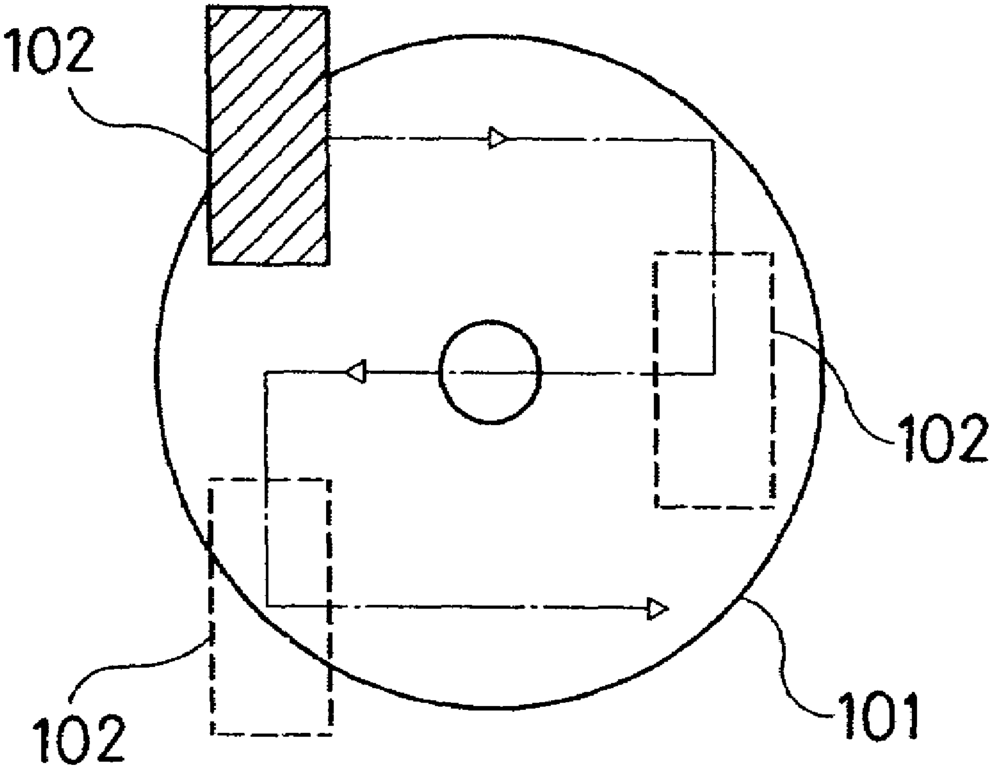
FIG. 7 is a schematic plan view that shows a conventional printing device on which a CD-R medium is placed.

The following description will discuss a fourth embodiment of the present invention. As illustrated in FIG. 6, the present embodiment is different from the first embodiment only in the points that the length of the printing head 36 is set to be substantially half as long as the radius of the CD-R medium 21 and the printing head 36 can translate in the radius direction of the CD-R medium 21. In the present embodiment, in the case that an index print is applied to the CD-R medium 21 by the printing head 36, the printing operation is first executed by rotating the CD-R medium 21 once with the printing head 36 being fixed at a position (a position indicated by a solid line in FIG. 6) close to the center of the CD-R medium 21. Next, the printing head 36 is translated (or the CD-R medium 21 is translated in a reverse direction) to a position apart from the center of the CD-R medium 21 (a position indicated by a chain double-dashed line in FIG. 6), and while fixed at this position, the CD-R medium 21 is rotated once so as to execute the printing operation. In this manner, it is possible to carry out the printing operation all over the upper surface of the CD-R medium 21.

Here, in the present embodiment, since the printing head 36, which has a length substantially half as long as the radius of the CD-R medium 21, is placed in a radial manner, the printing operation is carried out over the entire area thereof by simply allowing the CD-R medium 21 to rotate twice; however, it should be noted that, in the case that the printing head 36 is not placed in a radial manner with respect to the rotation center of the CD-R medium 21, the CD-R medium 21 needs to be rotated three or more times so as to carry out the printing operation over the entire area.

In accordance with the present embodiment, the same advantages as described in the first embodiment are obtained, and by allowing the printing head 36 to translate in the radial direction of the CD-R medium 21, it is possible to use the small-size printing head 36 having a length that is substantially half as long as the radius of the CD-R medium 21. However, the first embodiment is superior to the present embodiment in that the CD-R medium 21 needs to be rotated only once so as to complete the printing operation and in that no mechanism for translating the printing head 36 is required.

While there have been shown herein and described certain preferred embodiments of the invention, various design changes and modification may be made within the scope of the claimed invention without limiting to the illustrated embodiments. For example, in the above-mentioned embodiments, the digital image data obtained by picking up an image from a film is stored in a CD-R medium; however, the data may be stored in another disc-shaped recording medium such as a CD-RW medium. Moreover, with respect to the printing system, besides the ink-jet system, any known systems such as a sublimation type printer may be used.

Moreover, in the above-mentioned embodiments, the data recording and printing operations are simultaneously carried out with respect to the disk; however, either of these processes may be carried out first, and the other process may be carried out later depending on conditions such as the printing methods to be used. Moreover, not limited to the arrangement to be incorporated in a photograph processing apparatus, the present invention may be widely applied to general printing devices.

What is claimed is:

1. A printing device including a plurality of printing heads for carrying out a printing operation on one surface of a disk which rotates around the center thereof, wherein the printing operation is performed on the disk as the disk and the printing heads are relatively shifted by the rotation of the disk, and wherein the plurality of printing heads are installed adjacent to each other in the direction orthogonal to the radial direction of the disk so that at least one of the printing heads is installed in a radial manner with respect to a rotation center of the disk.

2. The printing device according to claim 1, further including:

a recording head for recording data on a surface opposite to the printing surface of the disk.

3. The printing device according to claim 2, wherein the printing process on the disk by the printing heads and the data recording process on the disk by the recording head are carried out at the same time.

4. The printing device according to claim 1, wherein the printing heads print information for identifying a photograph image.

5. The printing device according to claim 1, wherein the printing heads are fixedly secured to the printing device and have a length not less that that of a printing area located between the rotation center of the disk and an edge thereof.

6. The printing device according to claim 1, wherein three printing heads are installed adjacent to each other so that a first printing head is installed in a radial manner with respect to the rotation center of the disk and second and third printing heads sandwich the first printing head.

7. A printing device including a plurality of printing heads for carrying out a printing operation on one surface of a disk which rotates around the center thereof, wherein the printing operation is performed on the disk as the disk and the printing heads are relatively shifted by the rotation of the disk, and wherein the plurality of printing heads are installed adjacent to and spaced from each other so that at least one of the printing heads is installed in a radial manner with respect to the rotation center of the disk and an angle formed between longitudinal axes of two printing heads spaced furthest apart from each other is less than 90 degrees.

8. The printing device according to claim 7, further including:

a recording head for recording data on a surface opposite to the printing surface of the disk.

9. The printing device according to claim 8, wherein the printing process on the disk by the printing heads and the data recording process on the disk by the recording head are carried out at the same time.

10. The printing device according to claim 7, wherein the printing heads print information for identifying a photograph image.

11. The printing device according to claim 7, wherein the printing heads are fixedly secured to the printing device and have a length not less that that of a printing area located between the rotation center of the disk and an edge thereof.

* * * * *